July 29, 1947.　　　　H. L. MUELLER　　　　2,424,704
FABRICATED WHEEL STRUCTURE
Filed May 23, 1944

INVENTOR.
HOMER L. MUELLER
BY
Oberlin, Limbach & Day
ATTORNEYS

Patented July 29, 1947

2,424,704

UNITED STATES PATENT OFFICE 2,424,704

FABRICATED WHEEL STRUCTURE

Homer L. Mueller, Cleveland, Ohio, assignor to The Cleveland Welding Company, Cleveland, Ohio, a corporation of Ohio Application May 23, 1944, Serial No. 536,901

10 Claims. (Cl. 74—230.3)

1

This invention relates as indicated to fabricated wheel structures and more particularly to so-called wheel spiders adapted for attachment to a central hub and peripherally adapted for use either as a driving sprocket or for the attachment of other auxiliary devices such as rims and the like.

Prior art structures of the character to which the present invention relates have generally been formed of a casting, a practice which has obvious disadvantages. Where the prior art has resorted to fabricated structures, the parts from which the same have been composed have generally been so complex as to give rise to fabrication difficulties and high cost of manufacture.

It is a principal object of my invention, therefore, to provide a structure of the character described which satisfies all of the requirements such as strength, rigidity, etc., and which at the same time may be manufactured easily and economically.

It is a further object of the invention to provide a structure of the character described in which the principal parts are all simple shapes and in which only three separate shapes are required in order to build up the complete unit.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
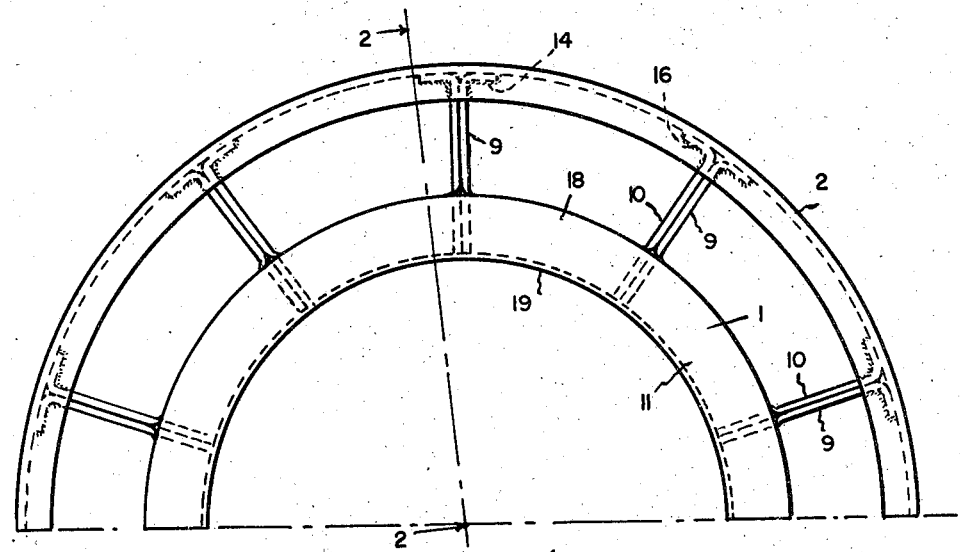
Fig. 1 is a side elevational view of one-half of a wheel spider formed in accordance with the principle of my invention.
Figure 2:
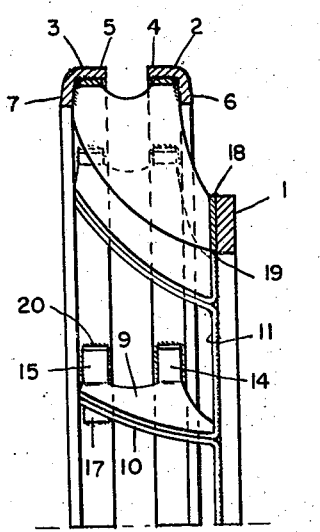
Fig. 2 is a transverse sectional view of the structure illustrated in Fig. 1 taken on a plane substantially indicated by the line 2—2.

Referring now more specifically to the drawing and more especially to Figs. 1 and 2, the assembly here illustrated comprises an inner annulus 1 so formed that its longest dimension in cross-section lies in a plane substantially at right angles to the axis of the annulus. Two identical annular members 2 and 3 which are angular in cross-section, as most clearly illustrated in Fig. 2, are arranged with their axially

2 extending legs 4 and 5 respectively turned toward each other and with their legs 6 and 7 respectively extending radially inwardly.

Figure 3:
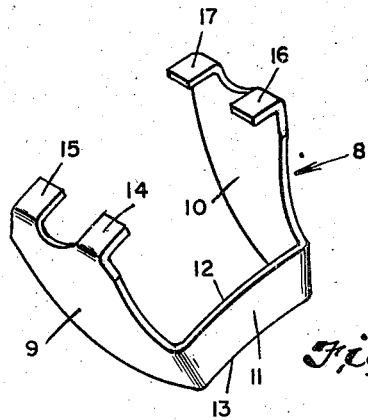
Fig. 3 is a perspective view of one of the elements of the assembly shown in the previous figures.

The annular members 1, 2, and 3 are maintained in assembled relation by means of a plurality of U-shaped members generally indicated at 8 in Fig. 3 and which comprise leg portions 9 and 10 connected by an integral intermediate portion 11. The portion 11 lies in a plane parallel to the plane of member 1 or a plane radially of the assembly with the upper edge 12 and the lower edge 13 arcuate in form to coincide with the arcuate form of the outer and inner peripheries respectively of the annulus 1 and the legs 9 and 10 extend in a generally radial direction.

The legs 9 and 10 are provided with projections 14 and 15, and 16 and 17, respectively. These legs are arranged in pairs extending toward each other and their outer surfaces lie in a cylindrical plane coinciding with the cylinder defined by the inner periphery of the legs 4 and 5 of the angular members 2 and 3.

The various parts are maintained in assembled relation by welding and such welding operation may be performed by any of the commercially available processes such as gas welding or preferably electric arc welding.

The U-shaped members 8 are placed in side-by-side relation and accordingly the leg connecting portions 11 thereof may be welded to the annulus 1 by substantially continuous circular beads at 18 and 19. Fillet welds such as 20 in the corners between the legs 14, 15, 16, and 17, and the corresponding annular members 2 and 3 with which they engage, will be sufficient to maintain the parts in assembled relation.

As previously indicated, the fabricated structure just described may be used as a sprocket, in which case the cylindrical surfaces provided by the annular members 2 and 3 form the bearing surfaces for the rollers on the sprocket chain and the space between the annular members 2 and 3 make possible engagement of the sprocket chain with the radially extending spokes each formed of two thicknesses of the stock from which the U-shaped member 8 is formed.

It should be noted that it is within the contemplation of my invention to omit either one of the annular members which have the angular cross-section, depending upon the particular end use to which the spider of my invention is to be placed.

While it is thus possible to provide an improved sprocket structure by the use of my invention, a rim or other like device may be secured to the periphery of the spider, depending upon the particular use for which the structure is ultimately designed.

Other modes of applying the principle of the invention may be employed, change being made as regards the details described, provided the features stated in any of the following claims or the equivalent of such be employed.

I, therefore, particularly point out and distinctly claim as my invention:

1. A wheel spider comprising a first annulus, a second annulus coaxial with said first annulus, and means for joining the same embodying a plurality of U-shaped stampings with leg portions of adjacent stampings abutted together, the stampings being welded in side-to-side relation to said first and second annuli.

2. A wheel spider comprising a flat annulus having its greatest cross-sectional dimension at right angles to its axis, a second annulus having an angle-shaped cross-section, coaxial with said flat annulus, and means for joining the same embodying a plurality of U-shaped stampings welded in side-to-side relation to said flat and angular shaped annuli.

3. A wheel spider comprising a flat annulus having its greatest cross-sectional dimension at right angles to its axis, a second annulus having an angle-shaped cross-section, coaxial with said flat annulus and positioned in a plane spaced from said flat annulus, and means for joining the same embodying a plurality of U-shaped stampings welded in side-to-side relation to said flat and angular shaped annuli.

4. A wheel spider comprising a flat annulus having its greatest cross-sectional dimension at right angles to its axis, a second annulus having an angle-shaped cross-section, coaxial with said flat annulus and positioned in a plane spaced from said flat annulus, one leg of such angle-shaped annulus extending radially and the other extending axially, and a plurality of U-shaped stampings having that portion which connects its legs in a plane parallel to the plane of said flat annulus, said U-shaped members welded in side-to-side relation to said flat and angular shaped annuli with the portion connecting said legs in contact with a radial face of said flat annulus.

5. A wheel spider comprising a flat annulus having its greatest cross-sectional dimension at right angles to its axis, a second annulus having an angle-shaped cross-section, coaxial with said flat annulus and positioned in a plane spaced from said flat annulus, one leg of such angle-shaped annulus extending radially and the other extending axially, and a plurality of U-shaped stampings having that portion which connects its legs in a plane parallel to the plane of said flat annulus, the ends of such legs bent toward each other, said U-shaped members welded in side-to-side relation to said flat and angular shaped annuli with the portion connecting said legs in contact with a radial face of said flat annulus, and the bent ends of said legs in contact with the inner face of the axially extending leg of said angle-shaped annulus.

6. A wheel spider comprising a first annulus, a pair of angle-shaped outer annuli with one leg each extending axially, and a plurality of U-shaped stampings welded in side-to-side relation to one face of said first annulus and to said angle-shaped annuli.

7. A wheel spider comprising a flat annulus having its greatest cross-sectional dimension at right angles to its axis, a pair of angle-shaped outer annuli with one leg each extending axially, and a plurality of U-shaped stampings welded in side-to-side relation to one face of said flat annulus and to said angle-shaped annuli.

8. A wheel spider comprising a flat annulus having its greatest cross-sectional dimension at right angles to its axis, a pair of angle-shaped annuli with one leg each extending axially, and such axially extending legs directed toward each other in spaced relation, and a plurality of U-shaped stampings welded in side-to-side relation to one face of said flat annulus and to said angle-shaped annuli.

9. A wheel spider comprising a flat annulus having its greatest cross-sectional dimension at right angles to its axis, a pair of angle-shaped annuli with one leg each extending axially, and such axially extending legs directed toward each other in spaced relation, and a plurality of U-shaped stampings having that portion which connects its legs in a plane parallel to the plane of said flat annulus, said portions connecting the legs of said U-shaped members welded in side-to-side relation to one face of said flat annulus and to said angle-shaped annuli.

10. A wheel spider comprising a flat annulus having its greatest cross-sectional dimension at right angles to its axis, a pair of angle-shaped annuli with one leg each extending axially, and such axially extending legs directed toward each other in spaced relation, and a plurality of U-shaped stampings having that portion which connects its legs in a plane parallel to the plane of said flat annulus, spaced projections on the ends of such legs with the projections on the separate legs extending toward each other, said portions connecting the legs of said U-shaped members welded in side-to-side relation to one face of said flat annulus, and the bent projections on the ends of said legs welded to said angle-shaped annuli.

HOMER L. MUELLER.

REFERENCES CITED

The following references are of record in the file of this patent:

UNITED STATES PATENTS

| Number | Name | Date |
| --- | --- | --- |
| 466,204 | Weeks | Dec. 29, 1891 |
| 1,400,442 | Kilcullen | Dec. 13, 1921 |
| 268,609 | Birdsall | Dec. 5, 1882 |
| 1,256,113 | Coe | Feb. 12, 1918 |